April 2, 1963  M. M. SEES  3,083,863
FLANGE CONSTRUCTION
Filed Jan. 29, 1959
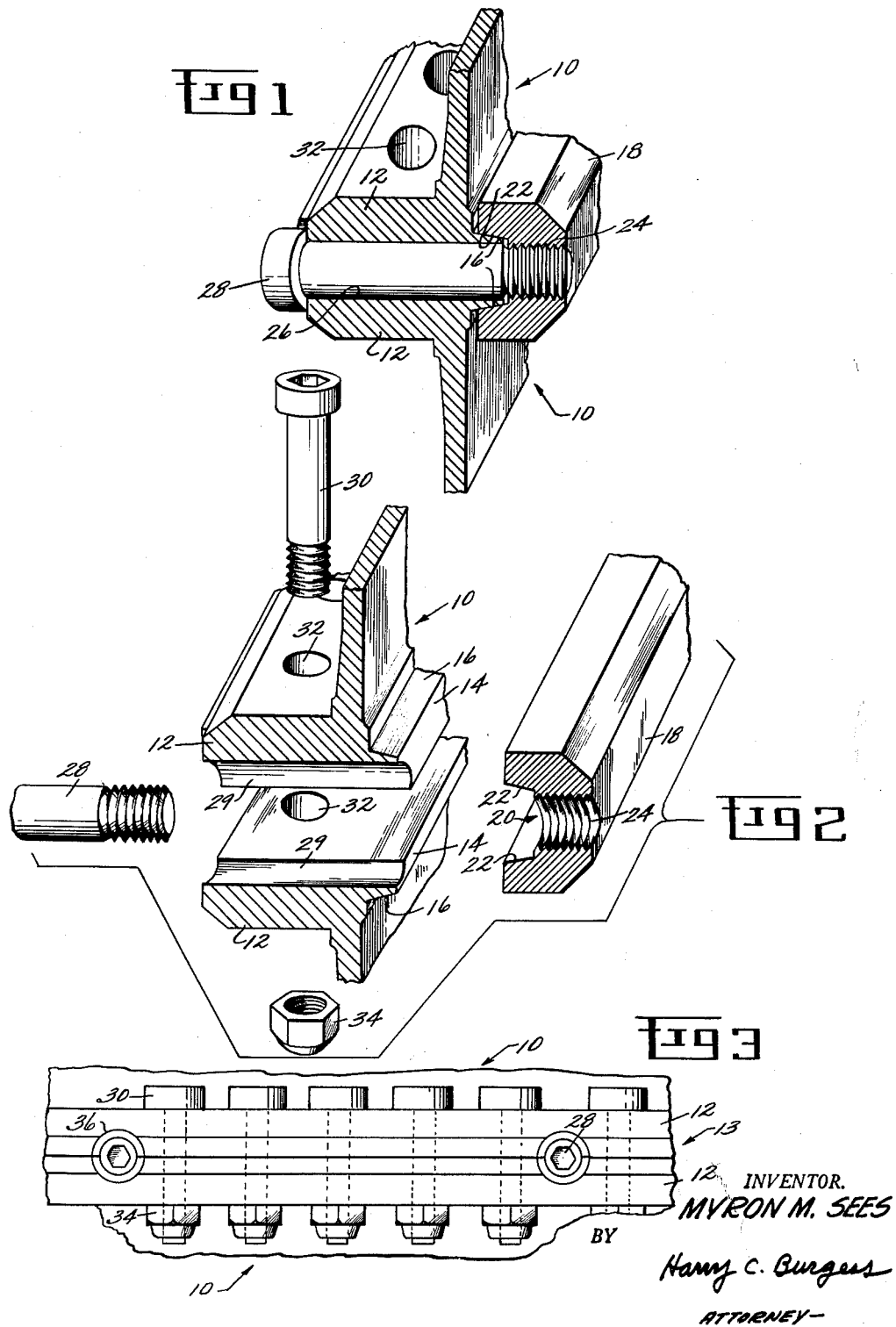
INVENTOR.
MYRON M. SEES
BY
Harry C. Burgess
ATTORNEY

United States Patent Office

3,083,863
Patented Apr. 2, 1963

3,083,863
FLANGE CONSTRUCTION
Myron M. Sees, Cincinnati, Ohio, assignor to General Electric Company, a corporation of New York
Filed Jan. 29, 1959, Ser. No. 790,010
1 Claim. (Cl. 220—80)

My invention relates to a flange construction, and more particularly, to a flange construction for use with high-pressure vessels where lightweight, low circumferential distortion, and prevention of leakage are of prime importance.

In the construction of high pressure vessels it is often necessary, or desirable, to "split" the outer shell or casing of the vessel longitudinally into two or more sections. Some means must then be utilized to securely fasten together the casing sections when the vessel is in use. A preferred means for joining the casing sections in high pressure applications is to provide a pair of externally-projecting flanges which extend along the casing "split" line and which are adapted to abut each other.

It is also well known that the most efficient external casing flange design is one employing a large number of relatively small bolts located as close as possible to the casing wall. However, in high-pressure applications the separation forces existing at the junction of the abutting flanges make necessary to the use of relatively large bolts which cannot be located as close to the casing wall as would be desirable. In addition, a large exterior bolt requires a larger, radially-extending flange surface, with the result that the flange moment arm is greater, i.e., the distance between the casing wall-to-flange connection and the bolt center line is increased. This construction is undesirable since the greater the moment arm the greater the tendency towards angular flange rotation at the junction of the casing wall-to-flange correction. Since angular flange rotation will tend to separate the abutted flanges, it is to be avoided in high-pressure vessels where leakage is detrimental, or even dangerous. For example, in a jet engine combustion chamber utilizing an axially-split, cylindrical casing having abutting flanges, separation of the flanges will allow leakage of hot gases which could result in a fire hazard.

Angular flange rotation is also undesirable in that it can cause circumferential deflection, or deformation, in a high-pressure cylindrical vessel having a "split" outer casing. Circumferential casing deflection can be particularly destructive of the rigidity essential for bearing alignment and support in a jet engine, for example, since the outer casing of such an engine also serves to support the main bearings, thus providing both support and alignment for moving parts of the engine.

A further disadvantage encountered with use of a large bolt and flange combination, particularly with respect to jet engine design, is the increase in weight, since in the past it has usually required a relatively massive external flange construction to completely eliminate distortion and leakage in a high-pressure casing.

Accordingly, it is an object of my invention to provide a flange construction for a high-pressure vessel having a "split" outer casing, which employs relatively light exterior flange members and relatively small flange fastenings, yet provides sufficient locking force to withstand high internal pressures and temperatures and substantially eliminates casing distortion and leakage.

Briefly, in accordance with one aspect of my invention, I provide a flange construction for a "split" outer casing of a high-pressure vessel, the construction having relatively light exterior flange members and flange fastenings which are made possible through use of a pair of internal projections, an internal locking member for pre-stressing the exterior flanges, and retaining means for supporting the locking member and causing it to engage the internal projections.

While the specification concludes with a claim specifically pointing out and distinctly claiming the subject matter which I regard as my invention, it is believed the invention will be better understood from the following description taken in connection with the accompanying drawings in which:

FIGURE 1 is a pictorial view of my flange construction in an assembled relationship and, FIGURE 2 is an exploded view of the flange construction and, FIGURE 3 is an exterior view directed interiorly of the casing along the exterior seam formed by the abutting casing flanges.

Referring now more particularly to FIG. 2, 10—10 refer generally to the walls of two sections of a high-pressure vessel having a "split" outer casing. The casing sections are joined by means of outwardly-projecting flanges 12—12 which extend along the casing "split" line being adapted to abut each other. When abutted, the flanges form an exterior casing seam, indicated generally at 13 in FIG. 3.

Extending interiorly of the casing are a pair of projections, or tangs 14, which may comprise partial extensions of the flanges by being formed integrally therewith as shown in the drawing. Each tang is shown as being approximately ½ the width and ¼ the length of its corresponding exterior flange projection. The tangs 14 may be constructed to abut each other, as shown in the drawings, in the same manner as do the flanges 12—12, to form an interior seam of the casing. The outer or non-abutting walls 16—16 of each of the tangs are tapered and hence form convergent walls when the tangs are in abutment.

Referring again to FIG. 2, I provide means for engaging the tangs to maintain them in a fixed relationship, pre-load the casing flanges, and prevent gas leakage, in the form of a solid locking-bar 18. In the embodiment shown, the locking-bar has a generally rectangular shape having approximately the same width as the flanges 12, when abutted, but extending interiorly of the casing for only about ½ the length that the flanges project outwardly of the casing. The locking-bar 18 contains an exteriorly-facing, longitudinally-extending groove, indicated generally at 20. The groove 20 has oppositely disposed divergent walls 22—22 spaced wide enough apart to enable them to encompass the abutted tangs 14. The tapered outer walls 16—16 of the tangs are adapted to coact with the divergent groove walls 22—22 to insure a proper fit without the necessity for excessively close tolerances in the groove and tang construction.

I provide retaining means for supporting the locking-bar and drawing it into engagement with the tangs including: a tapped hole 24 positioned in the bottom of the groove 20; a smooth bore 26 extending completely through the abutted flanges 12 and the tangs 14, the bore axis lying completely within the casing "split" line and normal to the casing walls; and a bolt 28 adapted to be received in the bore 26 and the tapped hole 24. It will be noted that the bore 26 actually comprises two semi-cylindrical grooves 29—29 in the abutting surfaces of each of the flanges 12—12. The bore 26 may be counterbored at 36 to aid in seating the bolt 28. Any other suitable means for drawing the locking-bar into engagement with the abutted tangs could be used in keeping with the spirit of my invention, however. For example, instead of the single bolt 28, smaller bolts could be used with smaller openings provided wholly within each of the flanges 12—12, the smaller openings extending in the same direction as the smooth bore 26 and adapted to be aligned with tapped holes which would be provided in the locking-bar on either side of the groove 20.

As stated above, my flange construction is particularly useful and beneficial where the prevention of leakage and circumferential casing distortion is highly desirable. At least one of these factors is usually considered in the design of say, a jet engine combustion chamber having an axially-split, generally cylindrical casing. One way to assemble a casing such as this utilizing my invention would be to partially thread a number of the bolts 28 into the tapped holes 24 in the locking-bar 18, bring the locking-bar into position interiorly of one of the casing sections with the groove 20 facing the tang, and then place the bolts 28 in the semi-circular groove 29 of the flange 12, while making sure that the bolts 28 protrude from the tapped holes 24 far enough to enable the locking-bar to clear the tang 14. The flange 12 of the second casing section would then be brought into abutment with the first-mentioned casing flange, the semi-circular grooves 29 in the second flange being aligned with the grooves 29 in the first flange to form the smooth holes 26 to encompass the bolts 28. With the casing sections now mated, preloading of the flanges is accomplished by drawing up on the bolts 28, which causes the locking-bar to move outwardly of the casing interior to securely engage the abutted tangs.

To complete the casing assembly, external fastenings are used to securely clamp together the external flanges 12—12. These fastenings may be of any suitable type, such as the bolts 30, adapted to pass through aligned holes 32 in the flanges, being secured therein by the nuts 34.

Although the smooth bores 26 are shown as being provided between every 5th and 6th flange bolt hole 32, this exact numerical relationship is not critical. It has been found, however, that relatively few locking-bar bolts are required to enable the bar to perform its "pre-load" and sealing function.

While I have shown the flanges, tangs and locking-bar as having certain relative physical dimensions, the exact size relationships are not limited to those shown. However, it should be noted that my flange construction employs a dual-load carrying system consisting of the exterior flanges 12 and the interior locking-bar and tang combination. The locking-bar part of the system functions to eliminate distortion by actually introducing a counteracting moment on the casing to oppose the inherent tendency for angular flange rotation of the exterior flanges, in other words, in my flange construction, this inherent tendency for angular flange rotation is minimized by having low-mass flanges which are made possible only by use of my locking-bar acting as a load carrier. Therefore to the extent that both portions of the system should be matched to give proper load distribution, obtain minimum casing weight, and minimize flange rotation, size relationships are important. The exact design of my flange construction will also depend, however, on such factors as the pressures expected to be contained within the casing, the operating temperatures, and the type of materials available from which the casing may be constructed. For example, in certain temperature and pressure ranges, it is known that high-strength, heat-treated alloys are desirable casing materials, particularly for jet engine casings, since the alloys have very favorable strength versus weight properties. However, to obtain the maximum mechanical and manufacturing advantages to be gained by use of these materials, the material sections utilized must have certain thicknesses, dependent on the alloy being used. If these materials were to be employed in jet engine construction, for instance, without utilization of my invention obvious design limitations would present themselves, such as, for example, the optimum thickness of a certain alloy section being too heavy for practical engine application.

I have therefore provided a flange construction which, with its internal locking-bar as a load-carrying member, lessens the external flange load, improves casing section sealing, and, with proper design (dependent on material, temperature and pressure factors), completely counteracts the circumferential casing distortion tended to be caused by angular rotation of the external flange members. In addition, by providing means for lessening the external flange load, I permit the use of small, more closely-spaced exterior flange bolts which makes possible a lighter, more efficient exterior flange.

My invention should not be taken as being limited to the exact embodiment shown and it is my intention to cover all changes and modifications which do not depart from the spirit and scope of my invention, herein claimed as follows:

I claim:

In combination; a high-pressure, thin-walled casing, said casing being axially split to comprise a pair of casing sections; a pair of externally-projecting flanges affixed to the casing section walls at the edges thereof, said flanges being in abutment along the casing split line to form an exterior seam; a plurality of external fasteners extending transversely through said flanges and maintaining the flanges in abutment to form a gas-tight seal along said exterior seam; a rigid, internally-projecting tang opposite each of said external flanges and integral therewith, said tangs being in continuous abutment internally of the casing to form an interior seam thereof; internal locking means comprising a bar co-extensive with said tangs, said bar including a groove having oppositely-disposed divergent walls, said tangs in abutment having convergent outer walls whereby the convergent outer tang walls and the divergent groove walls cooperate to pre-load the external casing flanges and provide a gas-tight seal for the interior seam; and means for retaining the locking-bar inside said casing comprising a plurality of partially-threaded mounting bolts supported in bores in the abutting external flanges and received in tapped holes in said locking-bar, said bolts being operable to draw said locking-bar groove into engagement with said tangs, the bolts also supporting the locking-bar when said groove is out of engagement with said tangs.

References Cited in the file of this patent

UNITED STATES PATENTS

| | | |
|---|---|---|
| 429,660 | Sullivan | June 10, 1890 |
| 514,822 | Gennert | Feb. 13, 1894 |
| 2,128,093 | James | Aug. 23, 1938 |
| 2,673,659 | Moore | Mar. 30, 1954 |